(12) United States Patent
Gajapathy

(10) Patent No.: US 10,310,743 B2
(45) Date of Patent: Jun. 4, 2019

(54) LATENCY IMPROVEMENTS BETWEEN SUB-BLOCKS

(71) Applicant: MICRON TECHNOLOGY, INC., Boise, ID (US)

(72) Inventor: Parthasarathy Gajapathy, Highland Village, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/714,743

(22) Filed: Sep. 25, 2017

(65) Prior Publication Data

US 2019/0095105 A1    Mar. 28, 2019

(51) Int. Cl.
*G06F 1/12* (2006.01)
*G06F 3/06* (2006.01)

(52) U.S. Cl.
CPC .......... *G06F 3/0611* (2013.01); *G06F 3/0659* (2013.01); *G06F 3/0679* (2013.01)

(58) Field of Classification Search
CPC ..... G06F 3/0611; G06F 3/0659; G06F 3/0679
USPC .......................................................... 365/154
See application file for complete search history.

(56) References Cited

U.S. PATENT DOCUMENTS

| | | | |
|---|---|---|---|
| 5,661,693 A * | 8/1997 | Akioka | G11C 7/065 365/189.05 |
| 6,714,438 B2 * | 3/2004 | Kawabata | G11C 7/1072 365/154 |
| 2003/0063489 A1 * | 4/2003 | Kawabata | G11C 7/1072 365/154 |
| 2018/0275714 A1 * | 9/2018 | Chang | G06F 1/12 |

* cited by examiner

*Primary Examiner* — Xiaochun L Chen
(74) *Attorney, Agent, or Firm* — Fletcher Yoder, P.C

(57) ABSTRACT

A semiconductor device includes a first functional block. The first functional block includes one or more input buffers configured to receive signals, and one or more flip-flops configured to receive the signals from the one or more input buffers and output the received signals from the first functional block. The semiconductor device also includes a second functional block coupled to the first functional block. The second functional block includes a decode logic configured to directly receive the output signals from the one or more flip-flops of the first functional block.

13 Claims, 3 Drawing Sheets

LATENCY IMPROVEMENTS BETWEEN SUB-BLOCKS

BACKGROUND

Field of the Present Disclosure

Embodiments of the present disclosure relate generally to the field of semiconductor devices. More specifically, embodiments of the present disclosure relate to improved architectures of functional blocks in semiconductor devices.

Description of Related Art

A semiconductor device, such as a microcomputer, memory, gate array, among others, may include command paths to transmit commands from a command source, such as an input pin, register, controller, and the like, to logic in the semiconductor device configured to implement the command. The command path may include synchronous digital circuits that may be used in the semiconductor device to facilitate implementing the command. For example, command data or signals may be stored in memory elements, such as flip-flops that are clocked via clock signals. A flip-flop holds input data until a pulse arrives at the next clock edge after one clock cycle, upon which the input data of the flip-flop is latched into its output. As such, the more flip-flops used, the longer the latency to pass data between memory elements. In addition, there may be clock latency (e.g., the delay between the clock source and the clock pin) associated with each flip-flop that may also add latency to the data communication path. Embodiments of the present disclosure may be directed to one or more of the problems set forth above.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described in detail below, in a synchronous data communication path, data may be transferred from or to a block that is clocked by a flip-flop. If a first block has a flip-flop on the output, a flip-flop on the input of a second block configured to receive the output data from the first block may be eliminated. As such, the latency in the synchronous data communication path may be reduced at least by one clock cycle.

Figure 1:
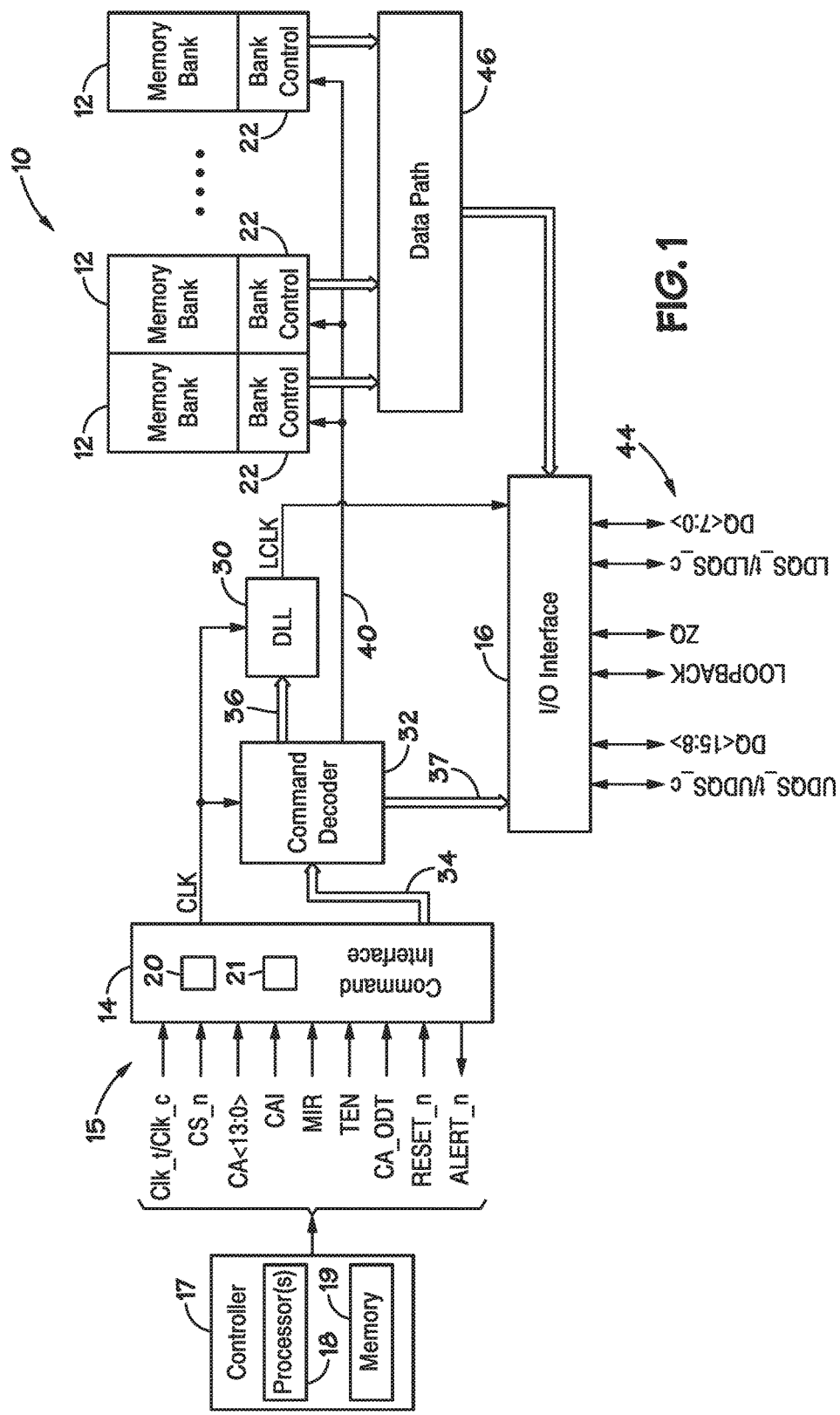
FIG. 1 is a simplified block diagram illustrating certain features of a semiconductor device, according to an embodiment of the present disclosure.

Turning now to the figures, FIG. 1 is a simplified block diagram illustrating certain features of a semiconductor device 10 (e.g., a memory device), according to an embodiment of the present disclosure. Specifically, the block diagram of FIG. 1 is a functional block diagram illustrating certain functionality of the memory device 10. In accordance with one embodiment, the memory device 10 may be a double data rate type five synchronous dynamic random access memory (DDR5 SDRAM) device. Various features of DDR5 SDRAM allow for reduced power consumption, more bandwidth and more storage capacity compared to prior generations of DDR SDRAM. While the present disclosure uses the memory device 10 as an example, it should be understood that embodiments of the present disclosure are envisioned to apply to any suitable semiconductor device, such as integrated circuits, transistors, processors, microprocessors, and the like.

The memory device 10, may include a number of memory banks 12. The memory banks 12 may be DDR5 SDRAM memory banks, for instance. The memory banks 12 may be provided on one or more chips (e.g., SDRAM chips) that are arranged on dual inline memory modules (DIMMS). Each DIMM may include a number of SDRAM memory chips (e.g., x8 or x16 memory chips), as will be appreciated. Each SDRAM memory chip may include one or more memory banks 12. The memory device 10 represents a portion of a single memory chip (e.g., SDRAM chip) having a number of memory banks 12. For DDR5, the memory banks 12 may be further arranged to form bank groups. For instance, for an 8 gigabit (Gb) DDR5 SDRAM, the memory chip may include 16 memory banks 12, arranged into 8 bank groups, each bank group including 2 memory banks. For a 16 Gb DDR5 SDRAM, the memory chip may include 32 memory banks 12, arranged into 8 bank groups, each bank group including 4 memory banks, for instance. Various other configurations, organization and sizes of the memory banks 12 on the memory device 10 may be utilized depending on the application and design of the overall system.

The memory device 10 may include a command interface 14 and an input/output (I/O) interface 16. The command interface 14 may include processing and/or interface circuitry configured to provide a number of signals (e.g., signals 15) from an external device, such as a controller 17. The controller 17 may include processing circuitry, such as one or more processors 18 (e.g., one or more microprocessors), that may execute software programs to, for example, provide various signals 15 to the memory device 10 to facilitate the transmission and receipt of data to be written to or read from the memory device 10. Moreover, the processor(s) 18 may include multiple microprocessors, one or more "general-purpose" microprocessors, one or more special-purpose microprocessors, and/or one or more application specific integrated circuits (ASICS), or some combination thereof. For example, the processor(s) 18 may include one or more reduced instruction set (RISC) processors. The controller 17 may couple to one or more memories 19 that may store information such as control logic and/or software, look up tables, configuration data, etc. In some embodiments, the processor(s) 18 and/or the memory 19 may be external to the controller 17. The memory 19 may include a tangible, non-transitory, machine-readable-medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof). The memory 19 may store a variety of information and may be used for various purposes. For example, the memory 19 may store machine-readable and/or processor-executable instructions (e.g., firmware or software) for the processor(s) 18 to execute, such as instructions for providing various signals 15 to the memory device 10 to facilitate the transmission and receipt of data to be written to or read from the memory device 10. As such, the controller 17 may provide various signals 15 to the memory device 10 to facilitate the transmission and receipt of data to be written to or read from the memory device 10.

As will be appreciated, the command interface 14 may include a number of circuits, such as a clock input circuit 20 and a command address input circuit 21, for instance, to ensure proper handling of the signals 15. The command interface 14 may receive one or more clock signals from an external device. Generally, double data rate (DDR) memory utilizes a differential pair of system clock signals, referred to herein as the true clock signal (Clk_t/) and the complementary clock signal (Clk_c). The positive clock edge for DDR refers to the point where the rising true clock signal Clk_t/ crosses the falling complementary clock signal Clk_c, while the negative clock edge indicates that transition of the falling true clock signal Clk_t and the rising of the complementary clock signal Clk_c. Commands (e.g., read command, write command, etc.) are typically entered on the positive edges of the clock signal and data is transmitted or received on both the positive and negative clock edges.

The I/O interface 16 may include processing and/or interface circuitry configured to manage and/or perform input/output operations between the memory device 10 and any suitable external device coupled to the I/O interface 16. The clock input circuit 20 receives the true clock signal (Clk_t/) and the complementary clock signal (Clk_c) and generates an internal clock signal CLK. The internal clock signal CLK is supplied to an internal clock generator 30, such as a delay locked loop (DLL) circuit. The internal clock generator 30 generates a phase controlled internal clock signal LCLK based on the received internal clock signal CLK. The phase controlled internal clock signal LCLK is supplied to the I/O interface 16, for instance, and is used as a timing signal for determining an output timing of read data.

The internal clock signal CLK may also be provided to various other components within the memory device 10 and may be used to generate various additional internal clock signals. For instance, the internal clock signal CLK may be provided to a command decoder 32. The command decoder 32 may receive command signals from the command bus 34 and may decode the command signals to provide various internal commands. For instance, the command decoder 32 may provide command signals to the internal clock generator 30 over the bus 36 to coordinate generation of the phase controlled internal clock signal LCLK. The command decoder 32 may also provide command signals to the I/O interface 16 over bus 37 to facilitate receiving and transmitting I/O signals. The phase controlled internal clock signal LCLK may be used to clock data through the IO interface 16, for instance. Further, the command decoder 32 may decode commands, such as read commands, write commands, mode-register set commands, activate commands, etc., and provide access to a particular memory bank 12 corresponding to the command, via the bus path 40.

As will be appreciated, the memory device 10 may include various other decoders, such as row decoders and column decoders, to facilitate access to the memory banks 12. In one embodiment, each memory bank 12 includes a bank control block 22 which provides the necessary decoding (e.g., row decoder and column decoder), as well as other features, such as timing control and data control, to facilitate the execution of commands to and from the memory banks 12. The memory device 10 executes operations, such as read commands and write commands, based on the command/address signals received from an external device, such as a processor. In one embodiment, the command/address bus may be a 14-bit bus to accommodate the command/address signals (CA<13:0>). The command/address signals are clocked to the command interface 14 using the clock signals (Clk_t/and Clk_c). The command interface may include a command address input circuit 21 which is configured to receive and transmit the commands to provide access to the memory banks 12, through the command decoder 32, for instance. In addition, the command interface 14 may receive a chip select signal (CS_n). The CS_n signal enables the memory device 10 to process commands on the incoming CA<13:0> bus. Access to specific banks 12 within the memory device 10 is encoded on the CA<13:0> bus with the commands.

In addition, the command interface 14 may be configured to receive a number of other command signals. For instance, a command/address on die termination (CA_ODT) signal may be provided to facilitate proper impedance matching within the memory device 10. A reset command (RESET_n) may be used to reset the command interface 14, status registers, state machines and the like, during power-up for instance. The command interface 14 may also receive a command/address invert (CAI) signal which may be provided to invert the state of command/address signals CA<13:0> on the command/address bus, for instance, depending on the command/address routing for the particular memory device 10. A mirror (MIR) signal may also be provided to facilitate a mirror function. The MIR signal may be used to multiplex signals so that they can be swapped for enabling certain routing of signals to the memory device 10, based on the configuration of multiple memory devices in a particular application. Various signals to facilitate testing of the memory device 10, such as the test enable (TEN) signal, may be provided, as well. For instance, the TEN signal may be used to place the memory device 10 into a test mode for connectivity testing.

The command interface 14 may also be used to provide an alert signal (ALERT_n) to the system processor or controller for certain errors that may be detected. For instance, an alert signal (ALERT_n) may be transmitted from the memory device 10 if a cyclic redundancy check (CRC) error is detected. Other alert signals may also be generated. Further, the bus and pin for transmitting the alert signal (ALERT_n) from the memory device 10 may be used as an input pin during certain operations, such as the connectivity test mode executed using the TEN signal, as described above.

Data may be sent to and from the memory device 10, utilizing the command and clocking signals discussed above, by transmitting and receiving data signals 44 through the IO interface 16. More specifically, the data may be sent to or retrieved from the memory banks 12 over the data path 46, which may include multiple data paths or bi-directional data buses. Data IO signals, generally referred to as DQ signals, are generally transmitted and received in one or more bi-directional data busses. For certain memory devices, such as a DDR5 SDRAM memory device, the IO signals may be divided into upper and lower bytes. For instance, for a x16 memory device, the IO signals may be divided into upper and lower IO signals (e.g., DQ<15:8> and DQ<7:0>) corresponding to upper and lower bytes of the data signals, for instance.

To allow for higher data rates within the memory device 10, certain memory devices, such as DDR memory devices may utilize data strobe signals, generally referred to as DQS signals. The DQS signals are driven by the external processor or controller sending the data (e.g., for a write command) or by the memory device 10 (e.g., for a read command). For read commands, the DQS signals are effectively additional data output (DQ) signals with a predetermined pattern. For write commands, the DQS signals are used as clock signals to capture the corresponding input data. As with the clock signals (Clk_t/ and Clk_c), the data strobe (DQS) signals may be provided as a differential pair of data strobe signals (DQS_t/ and DQS_c) to provide differential pair signaling during reads and writes. For certain memory devices, such as a DDR5 SDRAM memory device, the differential pairs of DQS signals may be divided into upper and lower data strobe signals (e.g., UDQS_t/ and UDQS_c; LDQS_t/ and LDQS_c) corresponding to upper and lower bytes of data sent to and from the memory device 10, for instance.

An impedance (ZQ) calibration signal may also be provided to the memory device 10 through the IO interface 16. The ZQ calibration signal may be provided to a reference pin and used to tune output drivers and ODT values by adjusting pull-up and pull-down resistors of the memory device 10 across changes in process, voltage and temperature (PVT) values. Because PVT characteristics may impact the ZQ resistor values, the ZQ calibration signal may be provided to the ZQ reference pin to be used to adjust the resistance to calibrate the input impedance to known values. As will be appreciated, a precision resistor is generally coupled between the ZQ pin on the memory device 10 and GND/VSS external to the memory device 10. This resistor acts as a reference for adjusting internal ODT and drive strength of the IO pins.

In addition, a loopback signal (LOOPBACK) may be provided to the memory device 10 through the IO interface 16. The loopback signal may be used during a test or debugging phase to set the memory device 10 into a mode wherein signals are looped back through the memory device 10 through the same pin. For instance, the loopback signal may be used to set the memory device 10 to test the data output (DQ) of the memory device 10. Loopback may include both a data and a strobe or possibly just a data pin. This is generally intended to be used to monitor the data captured by the memory device 10 at the IO interface 16.

As will be appreciated, various other components such as power supply circuits (for receiving external VDD and VSS signals), mode registers (to define various modes of programmable operations and configurations), read/write amplifiers (to amplify signals during read/write operations), temperature sensors (for sensing temperatures of the memory device 10), etc., may also be incorporated into the memory system 10. Accordingly, it should be understood that the block diagram of FIG. 1 is only provided to highlight certain functional features of the memory device 10 to aid in the subsequent detailed description. It should also be understood that various components present in the memory system 10 as in a DDR5 SDRAM device may also be present as in a double data rate type four synchronous dynamic random access memory (DDR4 SDRAM) device.

As set forth above, the semiconductor device 10 may include many functional blocks, such as the command interface 14, the clock input interface 20, the command address input circuit 21, the command decoder 32, etc. In a synchronous data communication path, data may be transferred from or to a functional block by one or more flip-flops (e.g., an input flip-flop, an output flip-flop) to facilitate appropriate data setup and hold time. As will be appreciated, if a first functional block has a flip-flop on the output, a second functional block configured to receive the output data from the first functional block may not need a flip-flop on the input. As such, the latency in the synchronous data communication path may be reduced at least by one clock cycle, as illustrated in FIGS. 2-4.

Figure 2:
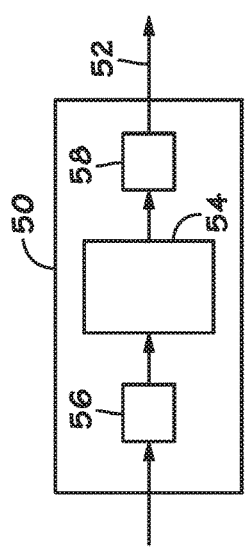
FIG. 2 is a simplified block diagram illustrating a functional block along a synchronous data communication path, according to an embodiment of the present disclosure.

FIG. 2 is a simplified block diagram illustrating a functional block 50 along a synchronous data communication path 52. The functional block 50 may include logic 54 coupled to flip-flops 56 and 58. The logic 54 may be configured to process and/or analyze the data input into the functional block 50. Each of the flip-flops 56 and 58 (clocked by a clock signal, such as the internal clock signal CLK) may hold data until a pulse arrives at the next clock edge after one clock cycle, upon which the input data at the input of the flip-flop is latched into its output. In the illustrated embodiment, the flip-flop 56 is on the input and the flip-flop 58 is on the output of the functional block 50. As such, the flip-flop 56 may setup and hold the input data for one clock cycle before the input data is input into the logic 54. The flip-flop 58 (clocked by a clock signal, such as the internal clock signal CLK) may setup and hold the data output by the logic 54 for one clock cycle before the output data is ready to be output from the functional block 50. Accordingly, each of the flip-flops 56 and 58 may attribute to at least one clock cycle of latency to the synchronous data communication path 52.

Figure 3:
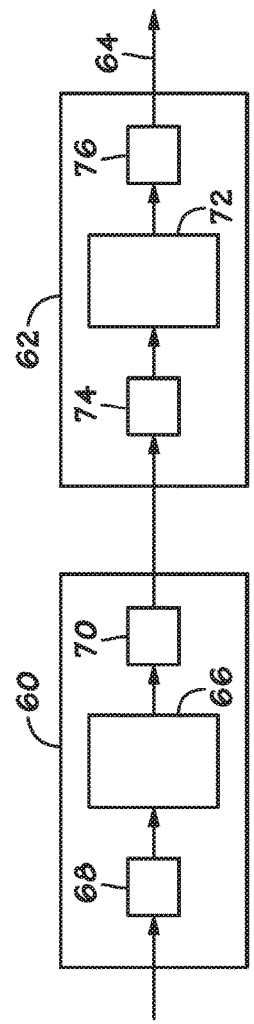
FIG. 3 is a simplified block diagram illustrating two functional blocks coupled to one another along a synchronous data communication path according to an embodiment of the present disclosure.
Figure 4:
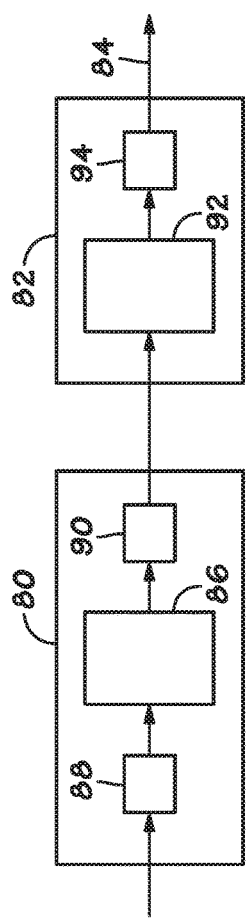
FIG. 4 is a simplified block diagram illustrating another example of two functional blocks coupled to one another along a synchronous data communication path, according to an embodiment of the present disclosure.

FIG. 3 is simplified block diagram illustrating two functional blocks 60 and 62 coupled to one another along a synchronous data communication path 64. In the illustrated embodiment, the functional blocks 60 and 62 are directly adjacent to one another, such that the functional block 62 may be configured to receive the output data from the functional block 60. The functional block 60 may include logic 66 coupled to a flip-flop 68 on the input and a flip-flop 70 on the output. The functional block 62 may also include logic 72 coupled to a flip-flop 74 on the input and a flip-flop 76 on the output. The logic 66 and 72 may be configured to process and/or analyze the data input into the respective functional blocks 60 and 62. The flip-flop 68 configured to latch data based on a clock signal, such as the internal clock signal CLK, may setup and hold the input data for at least one clock cycle before the input data is input into the logic 66. The flip-flop 70 configured to latch data based on a clock signal, such as the internal clock signal CLK, may setup and hold the data output by the logic 66 for at least one clock cycle before the output data is output from the functional block 60.

The flip-flop 74 of the functional block 62 may be configured to receive the output data from the flip-flop 70 of the functional block 60. The flip-flop 74 configured to latch data based on a clock signal, such as the internal clock signal CLK, may setup and hold the input data for one clock cycle before the input data is input into the logic 72. The flip-flop 76 configured to latch data based on a clock signal, such as the internal clock signal CLK, may setup and hold the data output by the logic 72 for at least one clock cycle before the output data is output from the functional block 62. Accordingly, each of the flip-flops 68, 70, 74, and 76 may attribute to at least one clock cycle of latency to the synchronous data communication path 64.

As will be appreciated, the inclusion of both of the flip-flops 70 and 74 of the data communication path 64 may not be necessary. That is, with having flip-flops 70 and 74 in direct succession may provide redundant setup and hold functionality for the logic 72 in the second functional block 62. This redundancy may be eliminated to minimize latency.

With this in mind, FIG. 4 provides an improved architecture with reduced latency compared to the design of FIG. 3. Specifically, FIG. 4 is another simplified block diagram illustrating two functional blocks 80 and 82 coupled to one another along a synchronous data communication path 84. The functional block 80 may include logic 86 coupled to a flip-flop 88 on the input and a flip-flop 90 on the output. The functional block 82 may include logic 92 coupled to a flip-flop 94 on the output. The logic 86 and 92 may be configured to process and/or analyze the data input into the respective functional blocks 80 and 82. The flip-flop 88 configured to latch data based on a clock signal, such as the internal clock signal CLK, may setup and hold the input data for at least one clock cycle before the input data is input into the logic 86. The flip-flop 90 configured to latch data based on a clock signal, such as the internal clock signal CLK, may setup and hold the data output by the logic 86 for at least one clock cycle before the output data is output from the functional block 80. It should be noted that the logic 92 of the functional block 82 is configured to directly receive the output data from the flip-flop 90 of the functional block 80 (e.g., there is no intervening elements, such as flip-flop, present between the flip-flop 90 and the logic 92). The flip-flop 94 configured to latch data based on a clock signal, such as the internal clock signal CLK, may setup and hold the data output by the logic 92 for at least one clock cycle before the output data is output from the functional block 82. Accordingly, each of the flip-flops 88, 90, and 94 may attribute to at least one clock cycle latency to the synchronous data communication path 84.

Figure 5:
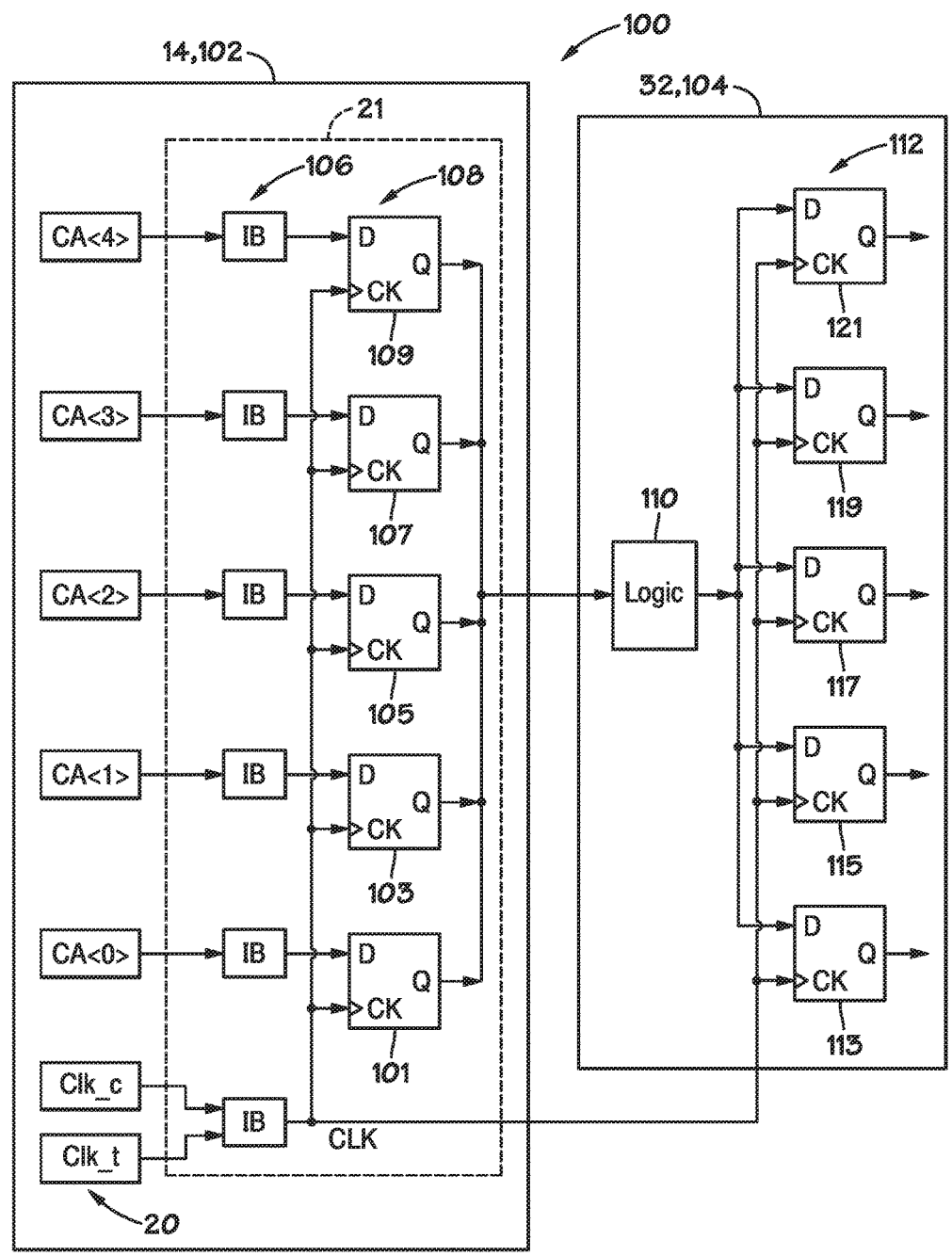
FIG. 5 is an example representation of functional blocks implemented in the semiconductor device of FIG. 1, illustrating certain features of a synchronous data communication path with reduced latency, according to an embodiment of the present disclosure.

With the foregoing in mind, FIG. 5 is an example representation of functional blocks implemented in a semiconductor device, illustrating certain features of a synchronous data communication path with reduced latency. In the illustrated embodiment, a synchronous data communication path 100 (e.g., the command bus 34) is between functional blocks 102 and 104. In particular, the functional block 102 may be the command interface 14 and the functional block 104 may be the commander decoder 32 of the semiconductor device 10 of FIG. 1.

The command interface 14 may include the command address input circuit 21 that is configured to provide access to the memory banks 12. The command address input circuit 21 may include one or more input buffers 106 coupled to one or more flip-flops 108. The one or more flip-flops 108 may each include an input pin D, an output pin Q, and a clock pin CK. The one or more input buffers 106 may be configured to receive command/address signals CA<13:0> (e.g., including a command portion CA<4:0> and an address portion CA<13:5>) and send the signals to the respective one or more flip-flops 108 (e.g., fourteen CA<13:0> signals sent to fourteen flip-flops 108). In one embodiment, the command/address signals CA<13:0> may be sent on two-cycle basis, such that the command portion CA<4:0> may be sent in the first clock cycle and the address portion CA<13: 5> may be sent in the second clock cycle. Although in the illustrated representation in FIG. 5, only communication of the command portion CA<4:0> is shown, the address portion CA<13:5> may be passed down along the synchronous data communication path 100 in the same manner. Alternatively, a portion of the address portion (e.g., CA<7:5>) may be sent along with the command portion on the first clock cycle. The command decoder 32 may include logic 110 (e.g., a decode logic) coupled to one or more flip-flops 112. The one or more flip-flops 112 may each include an input pin D, an output pin Q, and a clock pin CK. The logic 110 may be configured to receive signals (e.g., command/address signals CA<13:0>) directly from the respective flip-flops 108 (e.g., there is no intervening elements, such as flip-flop, present between the one or more flip-flops 108 and the logic 110) and may decode the signals and send the decoded signals to the respective one or more flip-flops 112.

Latching of each of the flip-flops 108 and 112 is clocked based on a clock signal, such as the internal clock signal CLK. As set forth above, the command interface 14 may include the clock input circuit 20 coupled to the command address input circuit 21 to ensure proper handling of the command/address signals. Based on the internal clock signal CLK generated by the clock input circuit 20, the one or more flip-flops 108 and 112 may control the timing of the command/address signals, as they are passed down the synchronous data communication path 100. For example, the one or more flip-flops 108 may setup and hold the data for one clock cycle, and the one or more flip-flops 112 may also setup and hold the data for one clock cycle. As illustrated, the one or more flip-flops 108 may include a flip-flop 101, a flip-flop 103, a flip-flop 105, a flip-flop 107, and a flip-flop 109, configured to latch the command/address signal CA<0>, CA<1>, CA<2>, CA<3>, and CA<4>, respectively, from the respective input pins D to the output pins Q based on the clock signal CLK. Accordingly, the one or more flip-flops 112 may include a flip-flop 113, a flip-flop 115, a flip-flop 117, a flip-flop 119, and a flip-flop 121, configured to latch the decoded command/address signal CA<0>, CA<1>, CA<2>, CA<3>, and CA<4>, respectively, from the logic 110 at the respective input pins D to the output pins Q based on the clock signal CLK.

It should be noted that because the one or more flip-flops 108 on the output of the functional block 102 (e.g., the command interface 14) already setup and hold the data output by the functional block 102, the functional block 104 (e.g., the command decoder 32) configured to receive the output data from the functional block 102 does not utilize flip-flops on the input. Instead, the logic 110 is configured to directly receive the output data from the functional block 102 (the second functional block 104 does not include any flip-flops on the input of the second functional block 104, between the one or more flip-flops 108 and the logic 110) to reduce the latency in the synchronous data communication path 100. As may be appreciated, the synchronous data communication path 100 may be designed to time the one or more flip-flops 108 to enable appropriate operation of the logic 110.

In one embodiment, the synchronous data communication path 64 illustrated in FIG. 3 may be employed in a double data rate type four synchronous dynamic random access memory (DDR4 SDRAM) device, and may be configured to operate at up to about 4000 gigahertz (GHz) at a clock cycle period (tCK) of as low as 625 picoseconds (ps), based on the clock speed requirements of the particular application. In one embodiment, the synchronous data communication path 84 illustrated in FIG. 4 or the synchronous data communication path 100 illustrated in FIG. 5 may be employed in a double data rate type five synchronous dynamic random access memory (DDR5 SDRAM) device. In a DDR5 SDRAM, the tCK may be decreased to about 500 ps, and possibly as low as 416 ps, from the tCK of about 625 ps configured for slower clock speeds as in DDR4 SDRAM. It should be noted that in general, for a given device architecture, the overall speed of the device may be faster if the clock speed increases.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A semiconductor device, comprising:
    a first functional block, comprising:
        one or more input buffers configured to receive signals; and
        one or more flip-flops configured to receive the signals from the one or more input buffers and output the received signals from the first functional block; and
    a command decoder coupled to the first functional block, comprising:
        a decode logic configured to directly receive the output signals from the one or more flip-flops of the first functional block; and
        one or more flip-flops configured to receive decoded signals from the decode logic and output the decoded signals from the command decoder, wherein the one or more flip-flops of the first functional block and the one or more flip-flops of the command decoder receive identical clock signals.

2. The semiconductor device of claim 1, wherein the first functional block comprises a command interface configured to receive the signals comprising command/address signals.

3. The semiconductor device of claim 1, wherein the first functional block comprises a clock input circuit configured to send clock signals and the one or more flip-flops of the first functional block are latched based on the clock signals.

4. The semiconductor device of claim 1, wherein the one or more flip-flops of the command decoder are configured to be latched based on one or more clock signals.

5. The semiconductor device of claim 1, wherein the semiconductor device is a double data rate type five synchronous dynamic random access memory (DDR5 SDRAM) device.

6. The semiconductor device of claim 5, wherein a clock cycle period of the DDR5 SDRAM device is less than or equal to about 500 picoseconds.

7. The semiconductor device of claim 6, wherein the clock cycle period of the DDR5 SDRAM device is approximately 416 picoseconds.

8. A semiconductor device, comprising:
    a first functional block, comprising:
        logic configured to receive signals; and
        one or more flip-flops configured to latch the signals received by the logic and output the signals from the first functional block; and
    a second functional block coupled to the first functional block, comprising a decode logic configured to receive the signals output from the one or more flip-flops of the first functional block, wherein the second functional block does not comprise flip-flops between the one or more flip-flops of the first functional block and the decode logic of the second functional block, and wherein the second functional block comprises one or more flip-flops configured to receive an output from the decode logic;
    wherein the one or more flip-flops of the first functional block and the one or more flip-flops of the second functional block are configured to be latched by identical clock signals, wherein the second functional block is a command decoder.

9. The semiconductor device of claim 8, wherein the first functional block comprises a command interface configured to receive and output command/address signals.

10. The semiconductor device of claim 8, wherein the logic comprise one or more input buffers.

11. The semiconductor device of claim 8, wherein the first functional block comprises a clock input circuit configured to send the clock signals and the one or more flip-flops of the first functional block are latched based on the clock signals.

12. The semiconductor device of claim 8, wherein one or more flip-flops of the second functional block coupled to the decode logic are configured to receive decoded signals from the decode logic and output the decoded signals from the second functional block.

13. The semiconductor device of claim 12, wherein the semiconductor device is a double data rate type five synchronous dynamic random access memory (DDR5 SDRAM) device.

* * * * *